US009376854B2

(12) United States Patent
Yoshimura et al.

(10) Patent No.: US 9,376,854 B2
(45) Date of Patent: Jun. 28, 2016

(54) GASOCHROMIC SYSTEM

(71) Applicants: Kazuki Yoshimura, Aichi (JP); Yasusei Yamada, Aichi (JP); Kazuki Tajima, Aichi (JP)

(72) Inventors: Kazuki Yoshimura, Aichi (JP); Yasusei Yamada, Aichi (JP); Kazuki Tajima, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 14/758,986

(22) PCT Filed: Dec. 16, 2013

(86) PCT No.: PCT/JP2013/083681

§ 371 (c)(1),
(2) Date: Jul. 2, 2015

(87) PCT Pub. No.: WO2014/109182

PCT Pub. Date: Jul. 17, 2014

(65) Prior Publication Data

US 2015/0354265 A1 Dec. 10, 2015

(30) Foreign Application Priority Data

Jan. 10, 2013 (JP) ................................. 2013-002675

(51) Int. Cl.

| | |
|---|---|
| ***G02F 1/01*** | (2006.01) |
| ***E06B 3/67*** | (2006.01) |
| ***G02F 1/19*** | (2006.01) |
| ***E06B 9/24*** | (2006.01) |
| ***G02F 1/15*** | (2006.01) |

(52) U.S. Cl.

CPC ................. *E06B 3/6722* (2013.01); *E06B 9/24* (2013.01); *G02F 1/15* (2013.01); *G02F 1/19* (2013.01); *E06B 2009/2464* (2013.01)

(58) Field of Classification Search

CPC . E06B 3/6722; E06B 9/24; E06B 2009/2464; G02F 1/19; G02F 1/15

USPC .................................. 359/240, 237, 265–275

See application file for complete search history.

(56) References Cited

U.S. PATENT DOCUMENTS

| | | | |
|---|---|---|---|
| 5,635,729 | A | 6/1997 | Griessen et al. |
| 5,905,590 | A | 5/1999 | Van Der Sluis et al. |

(Continued)

FOREIGN PATENT DOCUMENTS

| | | |
|---|---|---|
| JP | 2003-261356 | 9/2003 |
| JP | 2009-544997 | 12/2009 |

(Continued)

OTHER PUBLICATIONS

International Search Report mailed on Feb. 25, 2014.

*Primary Examiner* — Tuyen Tra

(74) *Attorney, Agent, or Firm* — IPUSA, PLLC

(57) ABSTRACT

A gasochromic system includes a first transparent part that includes a first surface; a second transparent part that includes a second surface and is disposed such that the second surface faces the first surface of the first transparent part; a light control part that is formed on the first surface and includes a light control element whose optical characteristic is reversibly changed by hydrogenation and dehydrogenation; a hydrogen supplier that supplies a hydrogen-containing gas into a gap between the first and second transparent parts; and a dehydrogenator that removes hydrogen from the gap between the first and second transparent parts. The first and second transparent parts are stacked via the light control part, and the second surface and a surface of the light control part facing the second surface are partially in contact with each other.

19 Claims, 8 Drawing Sheets

(56) References Cited

U.S. PATENT DOCUMENTS

| | | | |
|---|---|---|---|
| 6,647,166 B2 | 11/2003 | Richardson | |
| 7,414,772 B2 * | 8/2008 | Yoshimura | G02F 1/19 359/265 |
| 2003/0169476 A1 | 9/2003 | Yoshimura | |
| 2009/0323162 A1 | 12/2009 | Fanton et al. | |
| 2010/0039692 A1 | 2/2010 | Yamada et al. | |

FOREIGN PATENT DOCUMENTS

| | | |
|---|---|---|
| JP | 2010-066747 | 3/2010 |
| JP | 2010-078890 | 4/2010 |

* cited by examiner

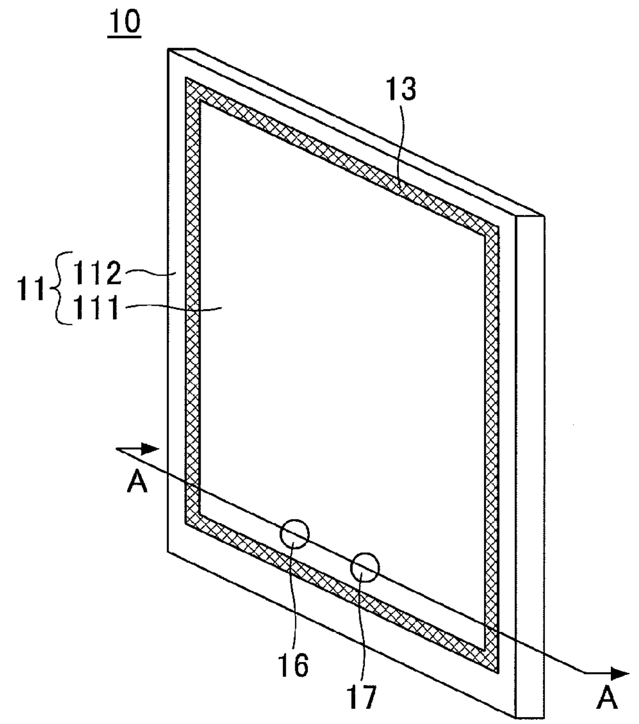
FIG.1B
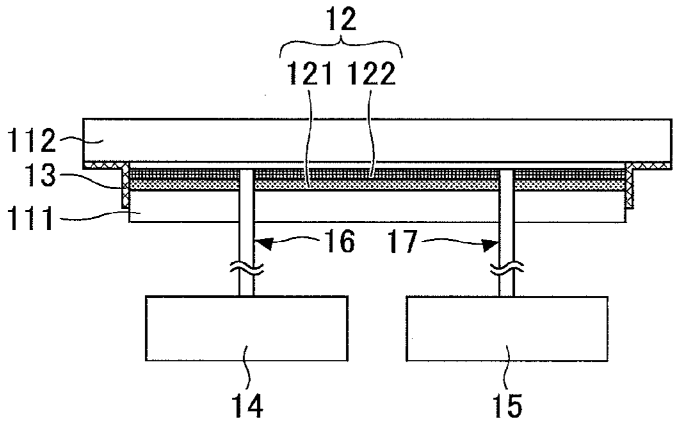

GASOCHROMIC SYSTEM

TECHNICAL FIELD

The present invention relates to a gasochromic system.

BACKGROUND ART

In general, a large amount of heat enters and leaves a building through windows (openings). For example, about 48% of heat is lost through a window when a heater is used during winter, and up to about 71% of heat enters through a window when a cooler is used during summer. Accordingly, a large amount of energy can be saved by properly controlling light and heat that pass through a window.

Switchable sheets developed for such a purpose have a function to control inflow and outflow of light and heat.

Several types of light control elements are used for such switchable sheets. For example, there are light control elements using materials described below.

1) An electrochromic material whose optical transmittance reversibly changes when an electric current or a voltage is applied.

2) A thermochromic material whose optical transmittance changes depending on a temperature.

3) A gasochromic material whose optical transmittance is changed by controlling an atmospheric gas.

Research is most advanced on electrochromic switchable sheets using a light control element made of an electrochromic material such as a tungsten oxide thin film. The research is almost in a commercial stage, and there are products available on the market. However, to provide a sufficient optical characteristic to an electrochromic switchable sheet, a light control element having a multilayer thin film structure including, for example, five layers needs to be used. This in turn increases the costs of the electrochromic switchable sheet. On the other hand, the structure of a light control element for a gasochromic system is relatively simple compared with a light control element for an electrochromic switchable sheet. For this reason, a gasochromic system is expected to be a promising candidate that can be manufactured at low costs, and research is being conducted on materials of a light control element and a configuration of a gasochromic system (see, for example, Patent Documents 1-4).

In a related-art gasochromic system, a pair of glass sheets are bonded together via a spacer to form a path for supplying hydrogen to a light control element, and the light control element is provided on at least one of the facing surfaces of the glass sheets.

RELATED-ART DOCUMENTS

Patent Documents

[Patent Document 1] U.S. Pat. No. 5,635,729

[Patent Document 2] U.S. Pat. No. 5,905,590

[Patent Document 3] U.S. Pat. No. 6,647,166

[Patent Document 4] Japanese Laid-Open Patent Publication No. 2010-066747

DISCLOSURE OF INVENTION

Problems to be Solved by the Invention

However, the related-art configuration where a pair of glass sheets are bonded together via a spacer increases the thickness of the entire gasochromic system and limits its shape. This in turn limits the application of the gasochromic system. For example, the related-art gasochromic system is not applicable to an automobile for which double-glazed glass cannot be used.

Also with the related-art gasochromic system, because there is a large space between the pair of glass sheets, a large amount of hydrogen is necessary for hydrogenation, and a long time is necessary for dehydrogenation to remove hydrogen from the space. Thus, the related-art configuration increases the size of a gasochromic system and requires a long time to change its optical characteristic.

An aspect of this disclosure makes it possible to provide a gasochromic system that can be made in a small size, has greater flexibility in shape compared with a related-art gasochromic system, and can perform hydrogenation and dehydrogenation in a short period of time with a small amount of hydrogen.

Means for Solving the Problems

In an aspect of an embodiment of the present invention, there is provided a gasochromic system that includes a first transparent part that includes a first surface; a second transparent part that includes a second surface and is disposed such that the second surface faces the first surface of the first transparent part; a light control part that is formed on the first surface and includes a light control element whose optical characteristic is reversibly changed by hydrogenation and dehydrogenation; a hydrogen supplier that supplies a hydrogen-containing gas into a gap between the first and second transparent parts; and a dehydrogenator that removes hydrogen from the gap between the first and second transparent parts. The first and second transparent parts are stacked via the light control part, and the second surface and a surface of the light control part facing the second surface are partially in contact with each other.

Advantageous Effect of the Invention

An aspect of this disclosure makes it possible to provide a gasochromic system that can be made in a small size, has greater flexibility in shape compared with a related-art gasochromic system, and can perform hydrogenation and dehydrogenation in a short period of time with a small amount of hydrogen.

BRIEF DESCRIPTION OF THE DRAWINGS

FIG. 1A is a perspective view of a gasochromic system according to a first embodiment;

FIG. 1B is a cross-sectional view of a gasochromic system according to the first embodiment;

DESCRIPTION OF EMBODIMENTS

Figure 2A:
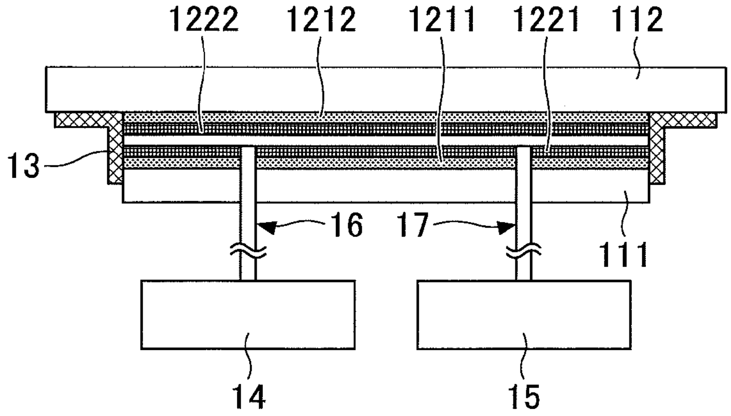
FIG. 2A is a drawing illustrating a gasochromic system according to the first embodiment.

Embodiments of the present invention are described below with reference to the accompanying drawings. However, the present invention is not limited to the embodiments describe below, and variations and modifications may be made without departing from the scope of the present invention.

First Embodiment

An exemplary configuration of a gasochromic system according to a first embodiment is described below.

A gasochromic system of the present embodiment includes a pair of transparent substrates disposed to face each other. A light control part including a light control element is formed on one or both of facing surfaces of the pair of transparent substrates. The optical characteristic of the light control element is reversibly changed by hydrogenation and dehydrogenation. The gasochromic system also includes a hydrogen supplier that introduces a hydrogen-containing gas into a gap between the pair of transparent substrates, and a dehydrogenator that removes hydrogen from the gap between the pair of transparent substrates. The pair of transparent substrates are stacked via the light control part. When the light control part is formed only on one of the facing surfaces of the pair of transparent substrates, a surface of the light control part is partially in contact with another one of the facing surfaces of the pair of transparent substrates. When light control parts are formed on both of the facing surfaces of the pair of transparent substrates, facing surfaces of the light control parts are partially in contact with each other.

An exemplary configuration of the gasochromic system is described below with reference to FIGS. 1A and 1B. FIG. 1A is a perspective view of the gasochromic system of the present embodiment, and FIG. 1B is a cross-sectional view of the gasochromic system taken along line A-A of FIG. 1A. In FIG. 1A, a hydrogen supplier 14 and a dehydrogenator 15 are omitted.

As illustrated by FIG. 1A, the gasochromic system includes a pair of transparent substrates 11. The pair of transparent substrates 11 include a first transparent substrate 111 and a second transparent substrate 112. A light control part 12 is provided on at least one of facing surfaces of the first transparent substrate 111 and the second transparent substrate 112. The first transparent substrate 111 and the second transparent substrate 112 are stacked via the light control part 12. In the illustrated example, the light control part 12 is provided on a surface of the first transparent substrate 111, and a surface of the light control part 12 is partially in contact with a facing surface of the second transparent substrate 112. The pair of transparent substrates 11 may be fixed to each other with a fixing part 13 to keep the above described state.

Also, as illustrated by FIG. 1B, pipes 16 and 17 are connected to openings formed in a surface of the first transparent substrate 111. The hydrogen supplier 14 for supplying a hydrogen-containing gas into a gap between the first and second transparent substrates and the dehydrogenator 15 for removing hydrogen form the gap between the first and second transparent substrates can be connected to the pipes 16 and 17, respectively.

In FIG. 1B, the gasochromic system is illustrated as if a gap is present between the second transparent substrate 112 and the light control part 12. However, this is just to clearly illustrate the configuration of the gasochromic system, and in practice, the second transparent substrate 112 and the light control part 12 may be partially in contact with each other. This also applies to FIG. 2A and subsequent figures.

Components of the gasochromic system are described below.

The transparent substrates 11 are described. The transparent substrates 11 include the first transparent substrate 111 and the second transparent substrate 112. In FIG. 1B, the first transparent substrate 111 and the second transparent substrate 112 have different thicknesses and sizes. However, the present invention is not limited to this example, and the first transparent substrate 111 and the second transparent substrate 112 may have the same thickness and size, or may be different from each other in one of thickness and size. Also, for example, surfaces of the transparent substrates may be mirror surfaces.

The first and second transparent substrates may have shapes other than flat plate shapes as illustrated in FIGS. 1A and 1B as long as they can be stacked via the light control part. Each transparent substrate may have a curved surface or a spherical surface in its plane, and may have any shape.

Although any material may be used for the transparent substrates 11, because they are used for the gasochromic system and intended to transmit visible light, a material having a high visible light transmittance is preferably used for the transparent substrates 11. For example, the transparent substrates are preferably comprised of glass and/or plastic. Examples of preferable plastic include acrylic plastic, polycarbonate, polyethylene terephthalate (PET), and polyethylene naphthalate (PEN).

Regardless of whether the transparent substrates are comprised of glass or plastic, the thicknesses of the transparent substrates may be freely determined based on, for example, thicknesses and strength required for the gasochromic system. The transparent substrates may be formed as sheets, thin plates, or thick plates.

An opening, to be connected to, for example, the hydrogen supplier, may be formed in the transparent substrates as necessary. In the example of FIGS. 1A and 1B, two adjacent openings are formed in a surface of the first transparent substrate 111. However, the number, shape, and size of openings are not limited to those in this example. When an opening is formed in a surface of a transparent substrate, it may affect the visibility. To prevent this problem, depending on the purpose of the gasochromic system, a pipe may be connected to a side of a transparent substrate such that the pipe communicates with a gap between transparent substrates.

Next, the light control part 12 is described.

The light control part 12 may be comprised of any material and may have any configuration as long as the light control part 12 includes a light control element 121 whose optical characteristic can be reversibly changed by hydrogenation and dehydrogenation.

Two types of materials are known for the light control element 121 whose optical characteristic is reversibly changed by hydrogenation and dehydrogenation. These materials include a reflection-type light control material called "switchable mirror thin film" and an absorption-type light control material. A reflection-type light control material and/or an absorption-type light control material may be used for a light control element of the gasochromic system of the present embodiment.

The reflection-type light control material is caused to switch between a transparent state and a mirror state where light is reflected, by hydrogenation and dehydrogenation. On the other hand, the absorption-type light control material is caused to switch between a transparent state and a colored, nontransparent state, by hydrogenation and dehydrogenation.

For example, a magnesium alloy thin film is preferably used for a reflection-type light control element made of a reflection-type light control material, and a transition metal oxide thin film is preferably used for an absorption-type light control element made of an absorption-type light control material. Thus, a magnesium alloy thin film and/or a transition metal oxide thin film is preferably used for the light control element.

A magnesium alloy thin film is preferably used as a reflection-type light control element as described above, and a magnesium alloy thin film including magnesium and a transition metal is particularly preferable. In terms of durability, a magnesium-nickel alloy thin film or a magnesium-yttrium alloy thin film is further preferable.

A transition metal oxide thin film is preferably used for an absorption-type light control element as described above, and a transition metal oxide thin film including one or more elements selected from tungsten oxide, molybdenum oxide, chromium oxide, cobalt oxide, nickel oxide, and titanium oxide is particularly preferable. In terms of coloration efficiency, a tungsten oxide thin film is further preferable.

The thickness of the light control element is not limited to a specific value, and may be determined based on, for example, required optical transmittance. For example, when a reflection-type light control material is used, the thickness of one light control element is preferably greater than or equal to 30 nm and less than or equal to 100 nm. On the other hand, when an absorption-type light control material is used, the thickness of one light control element is preferably greater than or equal to 300 nm and less than or equal to 800 nm. Here, the thickness of "one" light control element indicates the thickness of each light control element when multiple light control elements are used.

The light control element may be formed by any appropriate method. For example, the light control element may be formed on one or both of facing surfaces of the transparent substrates by sputtering, vacuum deposition, electron beam evaporation, chemical vapor deposition, or a sol-gel method.

One or more layers of light control elements may be provided. When two or more layers of light control elements are provided, the light control elements may be implemented only by one of a reflection-type light control material and an absorption-type light control material, or the light control elements may include both types.

The light control part of the present embodiment preferably includes a light control element whose optical characteristic is reversibly changed by hydrogenation and dehydrogenation, and a catalyst layer that functions as a catalyst for the hydrogenation and dehydrogenation reactions of the light control element. This configuration makes it possible to increase the rates of the hydrogenation and dehydrogenation reactions of the light control element. For example, as illustrated in FIG. 1B, a catalyst layer 122 is preferably formed (or stacked) on a surface, which is opposite from the transparent substrate 111, of the light control element 121 formed on the transparent substrate 111.

Any material that can increase the rates of the hydrogenation and dehydrogenation reactions of the light control element may be used for the catalyst layer. For example, the catalyst layer is preferably comprised of a thin film of palladium and/or platinum.

The thickness of the catalyst layer is not limited to a specific value, and may be determined freely based on, for example, costs and a required effect of increasing the reaction rate. For example, the thickness of the catalyst layer is preferably greater than or equal to 2 nm and less than or equal to 10 nm.

The catalyst layer may be formed by any appropriate method. For example, the catalyst layer may be formed by sputtering, vacuum deposition, electron beam evaporation, or chemical vapor deposition.

Also, more preferably, a buffer layer for preventing interdiffusion of components of the light control element and components of the catalyst layer may be provided between the light control element and the catalyst layer, and a protective film that is permeable to hydrogen and prevents oxidation of the light control element may be provided on a surface of the catalyst layer. The above configuration makes it possible to improve the durability of the gasochromic system against the repetition of switching by hydrogenation and dehydrogenation.

The buffer layer may be comprised of any material that can prevent interdiffusion of (metal) components of the light control element and components of the catalyst layer. For example, the buffer layer may be comprised of a metal thin film of titanium, niobium, tantalum, or vanadium.

The buffer layer may be formed by any appropriate method. For example, the buffer layer may be formed by sputtering, vacuum deposition, electron beam evaporation, or chemical vapor deposition.

The protective film is preferably a layer having hydrogen permeability and water repellency. The protective film is preferably comprised of a material that is permeable to hydrogen (proton) and impermeable (repellent) to water. For example, the protective film is preferably comprised of a polymer such as polytetrafluoroethyl, polyvinyl acetate, polyvinyl chloride, polystyrene, or cellulose acetate, or an inorganic thin film such as a titanium oxide thin film.

When the protective film is comprised of a polymer, the protective film may be formed, for example, by applying and drying a polymer dispersion liquid. When the protective film is comprised of an inorganic thin film, the protective film may be formed, for example, by sputtering an inorganic material.

In the example of FIG. 1B, the light control part 12 is formed on the first transparent substrate 111. However, the present invention is not limited to this example. As another example, the light control part 12 may be formed on the second transparent substrate 112 instead of on the first transparent substrate 111. Also, the light control part 12 may be formed on each of the first transparent substrate 111 and the second transparent substrate 112. Also in FIG. 1B, the light control part 12 includes the light control element 121 and the catalyst layer 122. However, as described above, the light control part 12 may also include a protective film and a buffer layer.

An exemplary configuration where the light control part 12 is formed on each of the first transparent substrate 111 and the second transparent substrate 112 is described with reference to FIG. 2A.

In the example of FIG. 2A, a first light control element 1211 and a second light control element 1212 are formed, respectively, on the first transparent substrate 111 and the second transparent substrate 112, and catalyst layers 1221 and 1222 are formed, respectively, on the first transparent substrate 111 and the second transparent substrate 112. Also in this case, protective films and buffer layers may be additionally provided.

In FIG. 2A, to clarify the structure, the gasochromic system is illustrated as if a gap is present between the catalyst layer 1221 and the catalyst layer 1222. However, in practice, the catalyst layer 1221 and the catalyst layer 1222 may be directly in contact with each other.

As described above, two types of materials (a reflection-type light control material and an absorption-type light control material) are available for the light control elements. The first light control element 1211 and the second light control element 1212 may be comprised of the same material or different materials.

Compared with a case where light control elements of the same type are used, using different types of light control elements at the same time makes it possible to provide a gasochromic system with a very wide optical dynamic range and is therefore preferable.

For example, a magnesium-yttrium alloy thin film, which is a reflection-type light control element, is in a mirror state before hydrogen is supplied, a chromium oxide thin film, which is an absorption-type light control element, is in a black color before hydrogen is supplied, and both of them hardly transmit light in these states.

On the other hand, when hydrogen is supplied, the magnesium-yttrium alloy thin film becomes transparent, the chromium oxide thin film also becomes transparent, and the entire gasochromic system becomes transparent.

Thus, when different materials are used in combination, the light control elements are in different colors in a mode to limit optical transmission of light. This in turn increases the optical dynamic range. Although the magnesium-yttrium alloy thin film and the chromium oxide thin film are used as examples in the above descriptions, any other combination of light control materials may be used.

Figure 2B:
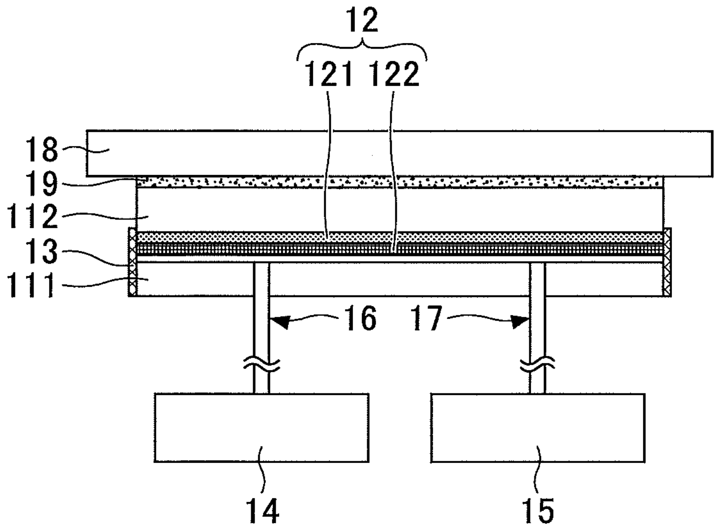
FIG. 2B is a drawing illustrating a gasochromic system according to the first embodiment.

FIG. 2B illustrates an example where the light control part 12 is formed on the second transparent substrate 112.

In FIG. 2B, the light control part 12 is provided on the second transparent substrate 112. In the example of FIG. 2B, the light control part 12 includes the light control element 121 and the catalyst layer 122. However, as described above, the light control part 12 may also include a protective film and a buffer layer. Further in FIG. 2B, the gasochromic system is bonded via an adhesive 19 to a transparent substrate 18. Thus, the gasochromic system of the present embodiment may be attached to another transparent substrate such as a windowpane when it is used. This is not limited to the case of FIG. 2B. The gasochromic systems illustrated by FIGS. 1A, 1B, and 2A may also be attached to a transparent substrate such as a windowpane.

When the gasochromic system of the present embodiment is attached to an area of the transparent substrate 18 such as a windowpane exposed to sunlight, the first transparent substrate 111 and the second transparent substrate 112 may be degraded by ultraviolet rays included in the sunlight depending on their material. To prevent degradation of the transparent substrates 111 and 112, the adhesive 19 is preferably made of a material that can block ultraviolet rays, or a film for blocking ultraviolet rays is preferably provided on the transparent substrate 18.

As described above, either a reflection-type light control material or an absorption-type light control material may be used for a light control element of the gasochromic system of the present embodiment. Here, when the light control element is made of a reflection-type light control material, the reflectance of the light control element varies depending on surfaces of a thin film constituting the light control element. When, for example, the light control element 121 made of a reflection-type light control material and the catalyst layer 122 are stacked on the transparent substrate 112 as illustrated in FIG. 2B, the reflectance of the light control element 121 seen from the transparent substrate 112 is different from the reflectance of the light control element 121 seen from the catalyst layer 122, and the reflectance of the light control element 121 seen from the transparent substrate 112 is higher than the other.

For this reason, the light control part is preferably formed so that a target reflectance is achieved in a desired direction. For example, when a reflection-type light control material is used for the light control element and its mirror surface needs to be disposed on the side of the transparent substrate 18, the light control part 12 is preferably arranged as illustrated in FIG. 2B.

Next, the fixing part 13 is described.

As described above, the light control part 12 is formed on one or both of the facing surfaces of the pair of transparent substrates 11, and the fixing part 13 is used to fix the pair of transparent substrates 11 to each other. The fixing part 13 may be implemented by any material that can fix the transparent substrates (111 and 112) to each other. For example, various types of adhesive or a tape as illustrated in FIGS. 1A and 1B may be used for the fixing part 13.

Because the gap between the transparent substrates is narrow, the amount of gas necessary for hydrogenation, and in some cases, even for dehydrogenation, is very small. Therefore, even when a supplied gas leaks out of the gap between the transparent substrates, the amount of leaked gas is very small and the leaked gas does not cause a big problem. Accordingly, it is not necessary to completely seal the gap between the transparent substrates with the fixing part 13. Also, as described later, an opening may be intentionally formed in the fixing part to release a gas such as hydrogen to the outside. Still, however, except for a case where an opening is intentionally formed as described above, it is preferable to seal the gap between the transparent substrates to prevent an unintentional leak of a gas such as hydrogen supplied to the light control part 12.

The transparent substrates 11 are fixed to each other by the fixing part 13 such that facing surfaces of one of the transparent substrates 11 and the light control part 12 or facing surfaces of the light control parts 12 formed on the corresponding transparent substrates 11 become partially in contact with each other. The distance between the facing surfaces is not limited to a specific value. However, the transparent substrates 11 are preferably fixed to each other such that an average distance between the facing surfaces having fine bumps and dents becomes between 0.1 mm and 0.2 mm. When a light control part is formed on one of the facing surfaces of a pair of transparent substrates, the "distance between facing surfaces" indicates a distance between a surface of the light control part and the other one of the facing surfaces of the transparent substrates. On the other hand, when light control parts are formed on both of the transparent substrates, the "distance between facing surfaces" indicates a distance between surfaces of the light control parts.

As described above, the gasochromic system of the present embodiment has a configuration where transparent substrates are stacked via the light control part 12 without placing a spacer between them. That is, the gasochromic system of the present embodiment is configured such that opposing surfaces of one of the transparent substrates 11 and the light control part 12 or opposing surfaces of the light control parts 12 formed on the corresponding transparent substrates 11 are partially in contact with each other.

It had been thought that it was not possible to secure a path for supplying a gas such as hydrogen when transparent substrates are stacked in this manner. However, the inventors of the present invention have found out that even when a transparent substrate and a light control part are formed to have flat surfaces, those surfaces still have very fine bumps and dents, and a gap is formed between the transparent substrate and the light control part (or between light control parts) as described above. Thus, the inventors of the present invention have confirmed that it is possible to secure a supply path for a gas such as hydrogen. The inventors have also found out that although the transparent substrate and the light control part or the light control parts partially contact with each other at various positions, it is possible to evenly control light because hydrogen diffuses in a lateral direction (along the surface of the transparent substrate).

For example, when transparent substrates of one meter square are stacked via a spacer as in the related-art gasochromic system to form a gap of 5 mm, the volume of gas necessary to fill the gap is 5 liters. On the other hand, when the transparent substrates are stacked close to each other as in the present embodiment, the volume of gas can be reduced to, for example, about 100 cc to 200 cc. Thus, the present embodiment makes it possible to reduce the amount of hydrogen necessary to hydrogenate a light control part. This in turn reduces the time necessary for hydrogenation and improves the responsiveness of a gasochromic system. As described above, when transparent substrates of one meter square are used for the related-art gasochromic system where the transparent substrates are stacked via a spacer, the gasochromic system contains 5 liters of a hydrogen-containing gas. Even though the concentration of the hydrogen-containing gas is low, there is a concern about the security of the gasochromic system. On the other hand, with the gasochromic system of the present embodiment where the volume of a space between transparent substrates is small, even when hydrogen filling the space (or gap) leaks, there is almost no risk that the leaked hydrogen is ignited.

Also, the present embodiment makes it possible to drastically increase the switching speed of a gasochromic system compared with the related-art gasochromic system.

One of the most effective ways to increase the switching speed is to introduce hydrogen into a space between transparent substrates after depressurizing the space. Here, with the configuration of the related-art gasochromic system, it is necessary to place spacers or pillars between the transparent substrates or glass sheets to cope with the atmospheric pressure applied to the transparent substrates as a result of the depressurization. However, because such spacers or pillars greatly affect visibility, it is practically impossible to depressurize the space between the transparent substrates with the configuration of the related-art gasochromic system. On the other hand, with the gasochromic system of the present embodiment where a transparent substrate and a light control part (or light control parts) are partially in contact with each other, the transparent substrates can cope with the atmospheric pressure applied thereto without using spacers and pillars even when the gap between the transparent substrates is vacuumized.

Below, the switching speed of the gasochromic system of the present embodiment is compared with the switching speed of electrochromic glass. In currently-commercialized electrochromic glass, the switching speed is determined by the electrical resistance of a transparent conductive film, and it takes at least about ten minutes to switch the entire electrochromic glass of one meter square. On the other hand, with the gasochromic system of the present embodiment using transparent substrates of the same size, it is possible to perform switching in several seconds by introducing hydrogen into a space between the transparent substrates after depressurizing the space. Thus, the present embodiment makes it possible to perform switching about 100 times faster than the related art.

Next, the hydrogen supplier 14 is described.

The hydrogen supplier 14 supplies a hydrogen-containing gas into a gap between the transparent substrates 11. As a non-limiting example, the hydrogen supplier may include a replaceable hydrogen cylinder. Also, the hydrogen supplier may include a hydrogen generator for generating hydrogen. The hydrogen supplied by the hydrogen supplier may be at a low concentration as long as it is sufficient to hydrogenate the light control part.

Because it is bothersome to replace cylinders, the hydrogen supplier is preferably configured to include a hydrogen generator.

In this case, any type of hydrogen generator may be used for this purpose.

Examples of hydrogen generators include a hydrogen generator that generates hydrogen by electrolysis of water, a hydrogen generator that generates hydrogen by electrolysis of moisture in the air, a hydrogen generator that generates hydrogen using a chemical reaction between water and a metal and/or a compound, and a hydrogen generator that generates hydrogen using a chemical reaction between moisture in the air and a metal and/or a compound. Also, two or more types of hydrogen generators may be used in combination. Further, a hydrogen generator may be used in combination with a hydrogen cylinder.

The gasochromic system of the present embodiment uses only a small amount of hydrogen for switching. Therefore, the hydrogen generator is preferably configured to generate hydrogen from moisture (a small amount of water in the air). For example, a hydrogen generator that generates hydrogen by electrolysis of moisture in the air or a hydrogen generator that generates hydrogen using a chemical reaction between moisture in the air and a metal and/or a compound is preferably used. These types of hydrogen generators can generate hydrogen without a supply of water and are therefore preferable.

A hydrogen generator that generates hydrogen by electrolysis of water may have any configuration as long as it includes a mechanism for electrolyzing water. For example, an electrolysis cell including a solid polymer electrolyte membrane may be used. Such an electrolysis cell can efficiently generate hydrogen with a voltage of about 3 V. Also, a hydrogen generator may be configured to directly electrolyze water including sodium hydroxide or potassium hydroxide with electrodes placed in the water.

A hydrogen generator employing electrolysis of moisture (vapor) in the air electrolyzes moisture in the air into hydrogen and oxygen using a polymer separation membrane. For example, a hydrogen generator may be implemented by an electrolysis cell 20 illustrated by FIG. 3.

Figure 3:
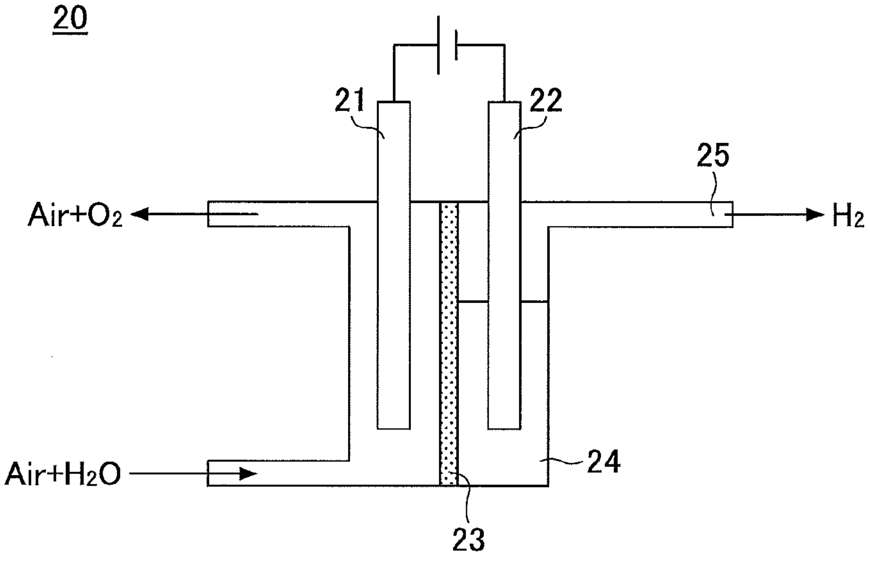
FIG. 3 is a drawing illustrating a hydrogen generator according to the first embodiment.

The electrolysis cell 20 of FIG. 3 includes an anode 21 and a cathode 22. A solid polymer electrolyte membrane 23 is provided between these electrodes, and water 24 is, disposed on the cathode side. When air containing moisture is supplied to the side of the anode 21, the moisture is electrolyzed and oxygen is generated on the side of the anode 21, and hydrogen is generated on the side of the cathode 22. This hydrogen generator implemented by the electrolysis cell 20 supplies oxygen from a hydrogen outlet 25 on the cathode side. Any other type of hydrogen generator that electrolyzes moisture in the air may also be used.

A hydrogen generator using a chemical reaction between water and a metal and/or a compound causes a metal and/or a compound, which generates hydrogen as a result of reaction with water, to react with water. An example of metal used for this purpose is magnesium metal, and examples of compounds used for this purpose include calcium hydride and magnesium hydride. Depending on the reaction to be achieved, salt and/or any other component may be added to water.

Figure 4:
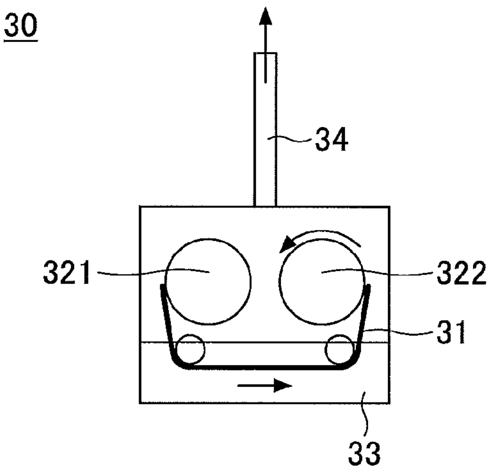
FIG. 4 is a drawing illustrating a hydrogen generator according to a second embodiment.

For example, a hydrogen generator employing a chemical reaction between water and a metal and/or a compound may have a configuration as illustrated by FIG. 4. A hydrogen generator 30 of FIG. 4 includes a first reel 321, and a tape 31 wound around the first reel 321 and carrying a metal and/or a compound that reacts with water. When generating hydrogen, a second reel 322 is rotated in a direction indicated by an arrow in FIG. 4. As a result, the tape 31 moves, and the metal and/or the compound being carried on the tape 31 is brought into contact with water 33 in a container and reacts with the water 33 to generate hydrogen. The generated hydrogen is supplied from a hydrogen supply tube 34 to the outside.

Any other type of hydrogen generator configured to cause a metal and/or a compound to contact and react with water may also be used.

This type of hydrogen generator employing a chemical reaction between water and a metal and/or a compound can generate a large amount of water without using much energy.

A hydrogen generator employing a chemical reaction between moisture in the air and a metal and/or a compound may be configured such that a substance that reacts with moisture in the air and generates hydrogen is placed in a container, and the substance is caused to react with the moisture in the container to generate hydrogen. Calcium hydroxide is an example of a substance that reacts with moisture in the air and generates hydrogen. This type of hydrogen generator can generate hydrogen with no supply of energy, and is therefore preferable.

A hydrogen generator employing a chemical reaction between moisture in the air and a metal and/or a compound is preferably configured to control the degree of contact between the air and the metal and/or the compound (which may be hereafter referred to as "metal/compound") to control the amount of hydrogen to be generated.

For example, when air is supplied by an air supplier such as a fan into a container containing the metal/compound, the amount of air supplied by the air supplier may be controlled.

Next, the dehydrogenator 15 is described.

The dehydrogenator 15 may have any configuration as long as it can remove hydrogen from a gap between the transparent substrates when dehydrogenating the light control part. For example, the dehydrogenator 15 may have one of first through third exemplary configurations described below.

The first exemplary configuration of the dehydrogenator 15 is described. The dehydrogenator 15 of the first exemplary configuration is implemented by an opening that communicates with the gap between the transparent substrates. The opening is preferably configured to be openable and closable with, for example, a valve. In this case, the valve is opened as necessary to allow hydrogen to naturally diffuse and flow out of the gap between the transparent substrates into the outside space. Because the diffusion rate of hydrogen is high, it is possible to perform dehydrogenation in a short period of time even with a configuration using no power-driven component.

Also, the valve may be omitted and the opening may be always kept open. In this case, the amount of hydrogen to be supplied for hydrogenation of the light control part is determined taking into account an amount of hydrogen lost from the opening.

The second exemplary configuration of the dehydrogenator 15 is described. In the second exemplary configuration, the dehydrogenator 15 preferably includes a gas supplier that supplies a gas into the gap between the transparent substrates.

This type of dehydrogenator supplies a gas into the gap between the transparent substrates to forcibly remove the hydrogen-containing gas in the gap and thereby performs dehydrogenation of the light control part. The dehydrogenator of the second exemplary configuration can remove hydrogen (hydrogen-containing gas) in the gap between the transparent substrate more quickly.

Although any type of gas that can remove hydrogen in the gap between the transparent substrates may be supplied by the gas supplier, an oxygen-containing gas is preferable. Using an oxygen-containing gas accelerates dehydrogenation because hydrogen is converted into water by the oxygen in the oxygen-containing gas. Also, air with reduced oxygen concentration and/or an inert gas containing oxygen is more preferably used as a gas supplied by the gas supplier.

Here, the "inert gas" indicates any gas that does not react with the light control part. Examples of inert gases include nitrogen, helium, neon, argon, krypton, and xenon. Among them, nitrogen, argon, and krypton are particularly preferable. The gas supplied by the gas supplier may be composed of one type of gas selected from the above described gases, or may be a mixture of multiple types of gases selected from the above described gases.

During research on the switching mechanism of a gasochromic system, the inventors of the present invention have found out that, as the gas supplied by the gas supplier, an oxygen-containing gas is preferable, and an oxygen-containing gas with a controlled oxygen concentration is particularly preferable. This is described in more detail below.

The optical characteristic of the light control element of the gasochromic system of the present embodiment is reversibly changed by hydrogenation and dehydrogenation. The dehydrogenation is performed by decreasing the concentration of hydrogen around the light control element, i.e., in the gap between the transparent substrates. Accordingly, dehydrogenation can be performed by decreasing the hydrogen concentration using a gas supplied by the gas supplier into the gap between the transparent substrates. As a result of further study on this approach, the inventors have found out that dehydrogenation can be accelerated by introducing oxygen in the gas supplied by the gas supplier because the oxygen converts hydrogen into water.

Here, when hydrogen and oxygen coexist in the gap between the transparent substrates during hydrogenation or dehydrogenation, the hydrogen and the oxygen react with each other and water is generated. Particularly, when palladium is used for the catalyst layer as described above, the reaction between the oxygen and the hydrogen is accelerated by the function of palladium as a combustion catalyst.

When water is generated in the gap between the transparent substrates, and the vapor pressure in the gap between the transparent substrates exceeds the saturation vapor pressure, condensation occurs on the surface of the light control part. When a part or the whole of the surface of the catalyst layer is covered by water generated by condensation, the reaction is an area covered by the water is inhibited and the hydrogenation of the light control element is slowed down. Particularly, when a magnesium alloy, which is easily affected by water, is used for the light control element, the performance of the light control element is reduced by the water.

For the above reasons, a gas with a properly-controlled oxygen concentration is preferably used as the gas to be supplied into the gap between the transparent substrates for dehydrogenation. That is, a gas containing oxygen at a concentration that does not cause condensation in the gap between the transparent substrates is preferably used. More specifically, the oxygen concentration of an oxygen-containing gas supplied by the gas supplier is preferably set at such a level that the amount of water (vapor pressure) generated in the gap between the transparent substrates due to the supplied oxygen-containing gas does not exceed the saturation vapor pressure. Also, the gasochromic system preferably includes a moisture remover for quickly removing generated water from the gap between the transparent substrates.

The gas supplier for supplying a gas may be implemented by a cylinder containing the gas. Particularly, the gas supplier may be implemented by a cylinder containing an oxygen-containing gas as described above. The dehydrogenator may include an oxygen reducer for reducing the amount of oxygen in a gas to be supplied by the gas supplier into the gap between the transparent substrates and/or a first moisture remover for removing moisture from the gas. For example, a gas that hardly causes condensation in the gap between the transparent substrates can be produced by causing, for example, air to pass through the oxygen reducer and/or the first moisture remover.

The oxygen reducer may be implemented by, for example, a deoxidizer or a nitrogen separator, and the first moisture remover may be implemented by, for example, a moisture removal membrane or a drying agent.

With the dehydrogenator of the second exemplary configuration, a gas is supplied by the gas supplier into the gap between the transparent substrates, and the supplied gas is discharged from the gap to the outside. For example, an opening (not shown) communicating with the gap may be formed to allow the gas to naturally diffuse and flow out of the gap between the transparent substrates into the outside space. Also, a pump may be connected to the opening to forcibly evacuate the gap between the transparent substrates.

For example, the opening may be formed in a part of the fixing part 13 for fixing the stacked transparent substrates to each other. Also, the opening may be formed in the transparent substrate. The opening may be always kept open. In this case, however, it is necessary to supply a greater amount of hydrogen for hydrogenation of the light control part taking into account an amount of hydrogen lost from the opening. Therefore, it is preferable to configure the opening to be openable and closable with, for example, a valve.

When the dehydrogenator includes the gas supplier for supplying an oxygen-containing gas as in the second exemplary configuration described above, the dehydrogenator preferably includes a hydrogen discharger for discharging hydrogen from the gap between the transparent substrates or a pressure reducer for reducing the pressure in the gap between the transparent substrates. In this case, it is preferable to reduce the hydrogen partial pressure in the gap between the transparent substrates with the hydrogen discharger or the pressure reducer before an oxygen-containing gas is introduced by the gas supplier into the gap between the transparent substrates to dehydrogenate the light control element.

The oxygen concentration of the oxygen-containing gas is preferably set at such a level that the amount of water generated in the gap between the transparent substrates due to the supplied oxygen-containing gas does not exceed the saturation vapor pressure.

Reducing the hydrogen partial pressure in the gap between the transparent substrates before supplying the oxygen-containing gas for dehydrogenation makes it possible to suppress generation of water in the gap.

The hydrogen discharger and the pressure reducer may have any appropriate configurations for discharging hydrogen from the gap between the transparent substrates and for reducing the pressure in the gap. However, a hydrogen discharger and a pressure reducer described below in the third exemplary configuration of the dehydrogenator may be preferably used.

As a variation of the dehydrogenator of the second exemplary configuration, the gas supplier may be configured to recycle the gas supplied into the gap between the transparent substrates, and the dehydrogenator may be configured to include the oxygen reducer and/or the first moisture remover in a path for supplying the recycled gas again into the gap between the transparent substrates. That is, the gas supplier may be configured to supply a gas into the gap between the transparent substrates and to recycle the gas released (or discharged) from the gap.

Figure 5A:
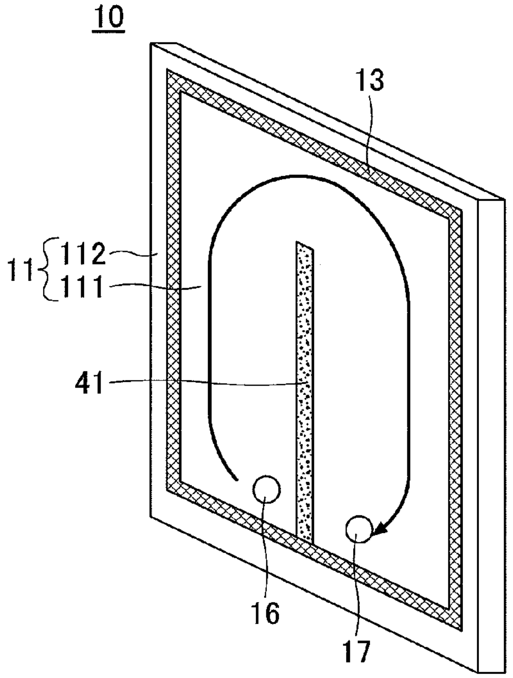
FIG. 5A is a perspective view of a gasochromic system according to the first embodiment.
Figure 5B:
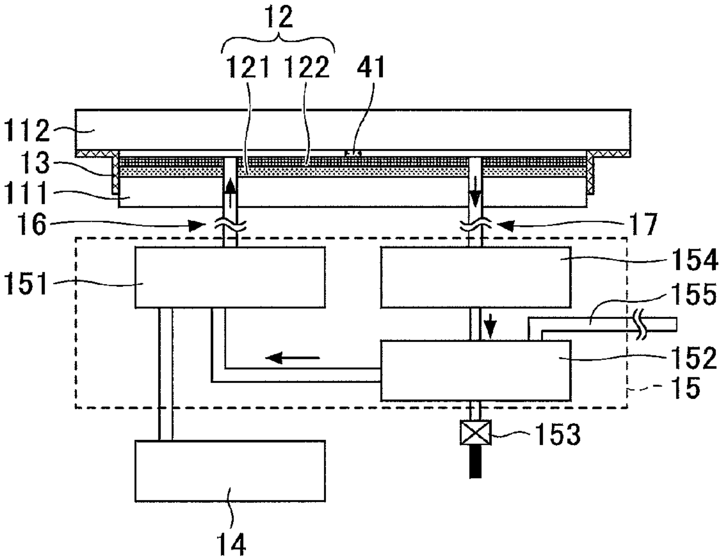
FIG. 5B is a cross-sectional view of a gasochromic system according to the first embodiment.

For example, the dehydrogenator 15 may be configured as illustrated by FIGS. 5A and 5B. Similarly to FIG. 1A, FIG. 5A is a perspective view of the gasochromic system, and similarly to FIG. 1B, FIG. 5B is a cross-sectional view of the gasochromic system. In FIG. 5A, the hydrogen supplier 14 and the dehydrogenator 15 are omitted. Descriptions of components already described with reference to FIGS. 1A and 1B are omitted here.

As illustrated by FIG. 5B, the dehydrogenator 15 may include a pump 151 used as the gas supplier. The pump 151 circulates a gas in a direction indicated by arrows in FIGS. 5A and 5B to discharge a hydrogen-containing gas from the gap between the transparent substrates. Also in this case, an oxygen-containing gas as described above is preferably used as the gas supplied and circulated by the pump 151, i.e., the gas supplier.

When a gas is circulated as in this variation, air may enter the circulating gas from, for example, the gap between the transparent substrates. Therefore, as illustrated in FIG. 5B, an oxygen reducer and/or first moisture remover 154 is preferably provided in the circulation path of the gas. The oxygen reducer may be implemented by an oxygen separation membrane or an oxygen adsorbent. The first moisture remover may be implemented by, for example, a moisture removal membrane or a drying agent. This configuration makes it possible to reduce or remove oxygen and moisture from a circulating gas, and thereby makes it possible to prevent degradation of the light control part.

When a circulating gas is used to remove hydrogen from the gap between the transparent substrates, the hydrogen enters the circulating gas. For this reason, a hydrogen remover for removing hydrogen from the circulating gas is preferably provided. The hydrogen remover may be implemented by, for example, micropores that communicate with the gap between the transparent substrates and are formed in a sealant for fixing the transparent substrates or in a circulation path connected to a pump. These micropores allow easily-diffusible hydrogen to flow out of the gasochromic system. In this case, the amount of hydrogen to be supplied from the hydrogen supplier 14 for hydrogenation is determined taking into account an amount of hydrogen lost from the micropores.

Also, a hydrogen separation unit 152 may be provided in the circulation path to discharge only separated hydrogen from a pipe connected to a valve 153. The hydrogen separator 152 may be implemented by, but are not limited to, a hydrogen separation membrane, a nitrogen separator, or a hydrogen storage material.

A hydrogen separation unit implemented by a hydrogen separation membrane separates only hydrogen from the circulating gas and discharges the separated hydrogen.

A hydrogen separator implemented by a nitrogen separator is preferably used when the circulating gas is air or a gas containing nitrogen as a major component. The nitrogen separator is implemented by, for example, polymer fibers. Oxygen, hydrogen, and water whose molecular sizes are greater than nitrogen are removed when they pass through the nitrogen separator, and are discharged. Thus, the nitrogen separator can remove oxygen and water in addition to hydrogen from the circulating gas, and is therefore particularly preferable.

A hydrogen separator implemented by a hydrogen storage material stores hydrogen contained in the circulating gas that is brought into contact with the hydrogen storage material. The hydrogen stored in the hydrogen storage material may be used for hydrogenation of the light control part.

When a nitrogen separator is used for the hydrogen separator 152, it is possible to also remove moisture and oxygen from the circulating gas without using the oxygen reducer and/or first moisture remover 154.

Using a mechanism for circulating a gas makes it possible to repeatedly use the gas. However, the gas may leak gradually through gaps between components and/or from the hydrogen separator. For this reason, as illustrated in FIG. 5B, it is preferable to provide a pipe 155 for replenishing the circulating gas. For example, a cylinder filled with a gas to be circulated may be connected to the pipe 155 to replenish the circulating gas.

Also, when the dehydrogenator 15 includes the oxygen reducer 154 and/or a nitrogen separator is used for the hydrogen separator 152, air may be supplied into the circulation path because its oxygen concentration can be reduced while being circulated. In this case, an air supplier may be connected to the pipe 155 for replenishing the circulating air. Providing a mechanism for replenishing the circulating gas makes it possible to make the amount of the circulating gas stable, and is therefore preferable.

When a mechanism for circulating a gas is provided as described above, the hydrogen supplier 14 may be connected to the pump 151 as illustrated in FIG. 5B so that hydrogen supplied from the hydrogen supplier 14 is mixed into the circulating air and supplied by the pump 151 to the gap between the transparent substrates. Alternatively, the hydrogen supplier 14 may be connected to an opening communicating with the gap between the transparent substrates to supply hydrogen to the gap.

Also, a bonding part 41 that bonds a part of a central portion in the width direction of one of the transparent substrates to the light control part formed on the other one of the transparent substrates is preferably provided as illustrated in FIGS. 5A and 5B so that the gas can be evenly circulated and supplied to the gap between the transparent substrates. With this configuration, when the gas is supplied from the pipe 16 connected to an opening, the gas circulates in the gap between the transparent substrates as indicated by an arrow in FIG. 5A, and leaves the gap between the transparent substrates from the pipe 17 connected to another opening. The bonding part 41 may also be provided even when the dehydrogenator has configurations other than this exemplary configuration. When the light control parts are provided on both of the transparent substrates, a bonding part may be provided between the uppermost layers of the light control parts.

The shape of the bonding part 41 is not limited to that illustrated in FIGS. 5A and 5B. The bonding part 41 may be formed in any shape so that the gas provided through one of the openings is evenly supplied to the gap between the transparent substrates.

Also in this case, when an oxygen-containing gas is used as the circulating gas, the dehydrogenator preferably includes a hydrogen discharger for discharging hydrogen from the gap between the transparent substrates or a pressure reducer for reducing the pressure in the gap between the transparent substrates, as in the second exemplary configuration of the dehydrogenator 15 described above. And, it is preferable to reduce the hydrogen partial pressure in the gap between the transparent substrates with the hydrogen discharger or the pressure reducer before an oxygen-containing gas is introduced by the gas supplier into the gap between the transparent substrates to dehydrogenate the light control element.

The oxygen concentration of the oxygen-containing gas is preferably set at such a level that the amount of water generated in the gap between the transparent substrates due to the supplied oxygen-containing gas does not exceed the saturation vapor pressure.

This configuration makes it possible to suppress generation of water in the gap between the transparent substrates.

The hydrogen discharger and the pressure reducer may have any appropriate configurations for discharging hydrogen from the gap between the transparent substrates and for reducing the pressure in the gap. However, a hydrogen discharger and a pressure reducer described below in the third exemplary configuration of the dehydrogenator may be preferably used.

With this configuration, a part of the circulating air is removed by the hydrogen discharger or the pressure reducer, and the amount of the circulating gas is reduced. Therefore, it is preferable to provide a mechanism to replenish the circulating are from the pipe 155 as described above. Also, when discharging hydrogen from the gap between the transparent substrates or reducing the pressure in the gap, it is preferable to isolate the gap from the circulation path. For example, valves for opening and closing the pipes 16 and 17 may be provided.

The third exemplary configuration of the dehydrogenator 15 is described. In the third exemplary configuration, the dehydrogenator includes a hydrogen discharger for discharging hydrogen from the gap between the transparent substrates or a pressure reducer for reducing the pressure in the gap between the transparent substrates.

The hydrogen discharger or the pressure reducer suctions and discharges hydrogen from the gap between the transparent substrates, and if necessary, also reduces the pressure in the gap between the transparent substrates. The hydrogen discharger and the pressure reducer may be implemented, for example, by a pump (vacuum pump), a fuel cell, a hydrogen adsorbent, and/or a hydrogen storage material. The dehydrogenator of the third exemplary configuration performs dehydrogenation by removing hydrogen from the gap between the transparent substrates using the hydrogen discharger or the pressure reducer.

When a pump is employed, the intake port of the pump may be connected to the pipe 17 connected to the opening formed in the transparent substrate as described above. Any type of pump that can discharge hydrogen from the gap between the transparent substrates or reduce the pressure in the gap may be used. For example, a rotary pump or diaphragm pump is preferably used.

Using a pump as the hydrogen discharger or the pressure reducer makes it possible to perform particularly dehydrogenation in a short period of time and is therefore preferable. Also, as described later, it is possible to reduce the time necessary for hydrogenation by evacuating (or depressurizing) the gap between the transparent substrates before supplying hydrogen into the gap. Using a pump for the dehydrogenator is preferable because the pump can also be used for this purpose.

As described above, the gasochromic system of the present embodiment has a structure where a pair of transparent substrates are stacked via a light control part(s), and one of the transparent substrates and the light control part (or the light control parts) are directly in contact with each other. With this configuration, it is not necessary to reinforce the structure with, for example, pillars in order to evacuate the gap between the transparent substrates.

A configuration using a fuel cell for the hydrogen discharger is described. In this case, for example, the hydrogen electrode side of the fuel cell may be connected to the pipe 17 connected to the opening. With this configuration, the hydrogen electrode side of the fuel cell consumes hydrogen when generating electricity and thereby draws and removes hydrogen from the gap between the transparent substrates. On the other hand, air may be supplied to the oxygen electrode side of the fuel cell. The electricity generated by the fuel cell may be used for peripheral components of the gasochromic system.

A configuration using a hydrogen adsorbent and/or a hydrogen storage material for the hydrogen discharger is described. In this case, for example, a container containing the hydrogen adsorbent and/or the hydrogen storage material may be connected via a valve to the pipe 17 connected to the opening. When suctioning and removing hydrogen from the gap between the transparent substrates, the valve is opened to cause the hydrogen adsorbent and/or the hydrogen storage material to adsorb and/or store hydrogen. The hydrogen adsorbed on and/or stored in the hydrogen adsorbent and/or the hydrogen storage material may be released and used for hydrogenation of the light control part.

Although examples of the hydrogen discharger and the pressure reducer are described above, the hydrogen discharger and the pressure reducer may also be implemented by other types of components that can suction and discharge hydrogen from and reduce the pressure in the gap between the transparent substrates. Also, each of the hydrogen discharger and the pressure reducer may be implemented by a combination of multiple types of components.

The gasochromic system of the present embodiment may include additional components.

For example, the gasochromic system may also include a pressure reducer for reducing the pressure in the gap between the transparent substrates. The pressure reducer may be used to remove oxygen and moisture (or reduce the oxygen partial pressure and the vapor partial pressure) in the gap between the transparent substrates before hydrogenation. This makes it possible to suppress generation of water due to supplied hydrogen, and suppress condensation even when water is generated. Removing oxygen and moisture also makes it possible to increase the rate of hydrogenation reaction when hydrogen is supplied. The pressure reducer may also be used to remove hydrogen from the gap between the transparent substrates during dehydrogenation. This makes it possible to accelerate the dehydrogenation reaction, and makes it possible to suppress generation of water even when an oxygen-containing gas is supplied. As described in the second exemplary configuration, the variation of the second exemplary configuration, and the third exemplary configuration of the dehydrogenator, when the dehydrogenator includes a pressure reducer for reducing the pressure in the gap between the transparent substrates, the pressure reducer may also be used in a hydrogenation process as described above. Also, a pressure reducer for the hydrogenation process may be provided separately from the pressure reducer of the dehydrogenator.

The gasochromic system of the present embodiment may further include an oxygen remover for removing oxygen from the gap between the transparent substrates and/or a second moisture remover for removing moisture from the gap. The oxygen remover and/or the second moisture remover may be disposed to directly communicate with the gap between the transparent substrates. These components make it possible to keep the oxygen partial pressure and the vapor partial pressure in the gap between the transparent substrates at low levels, and thereby makes it possible to suppress degradation of the light control element.

In this case, it is preferable to remove oxygen and/or moisture from the gap between the transparent substrates with the oxygen remover and/or the second moisture remover before hydrogen is supplied by the hydrogen supplier into the gap. This configuration makes it possible to prevent generation of water due to supplied hydrogen in the gap between the transparent substrates, and to suppress condensation even when water is generated.

The gasochromic system of the present embodiment may further include a hydrogen concentration detector for detecting the concentration of hydrogen in the gap between the transparent substrates. The hydrogen concentration detector may be implemented by a known hydrogen concentration sensor. However, because the electric resistance of the light control element of the present embodiment changes depending on the surrounding hydrogen concentration, the hydrogen concentration detector may be configured to detect the hydrogen concentration by measuring the electric resistance of the light control element.

Figure 6:
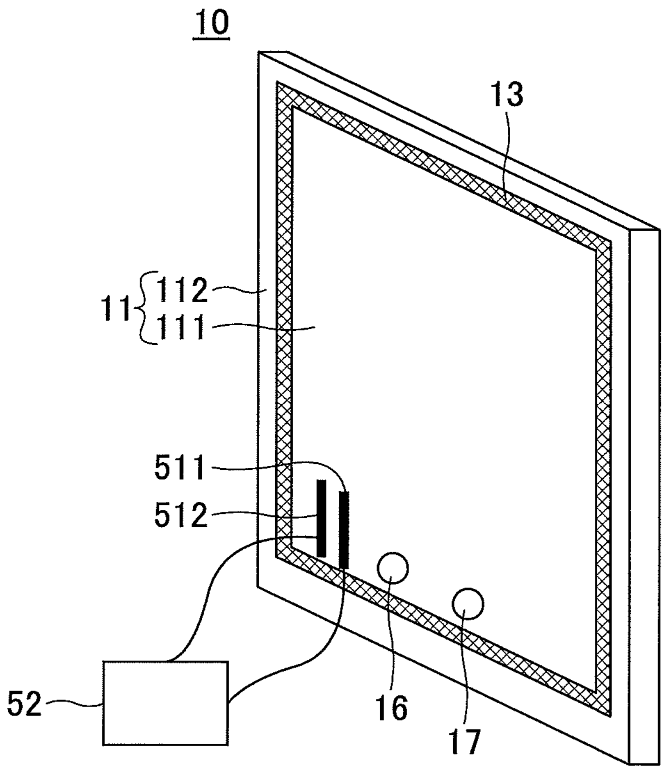
FIG. 6 is a drawing illustrating an exemplary configuration of a gasochromic system of the first embodiment including a hydrogen concentration detector.

For example, as illustrated by FIG. 6, the hydrogen concentration detector may include electrodes 511 and 512 disposed on the light control part, particularly on the surface of the light control element, and an electric resistance measuring device 52 connected to the electrodes 511 and 512, and may be configured detect the hydrogen concentration in the gap between the transparent substrates based on an electric resistance measured by the electric resistance measuring device 52.

With the above configuration where the hydrogen concentration in the gap between the transparent substrates 11 is detected by simply measuring an electric resistance, it is possible to provide a hydrogen concentration detector that can easily detect the hydrogen concentration in the gap at low costs.

Detecting the hydrogen concentration in the gap between the transparent substrates 11 in turn makes it possible to easily control the hydrogen supplier 14 and the dehydrogenator 15 during the hydrogenation and dehydrogenation processes. Also, because the optical characteristic (transparency) of the light control part can be determined based on the hydrogen concentration, it is possible to control supply and removal of hydrogen to achieve a desired optical characteristic. Further, the gasochromic system may be configured to issue an alarm when an abnormal change in the hydrogen concentration is detected.

Also, the gasochromic system preferably includes a hydrogen concentration reducer for reducing the concentration of hydrogen in a hydrogen-containing gas discharged from the gasochromic system, on a path for discharging the hydrogen-containing gas. The hydrogen concentration reducer preferably includes palladium and/or a hydrogen storage material.

When the hydrogen concentration reducer includes palladium, hydrogen flown into a discharge pipe and oxygen in the air are caused to react with each other by the catalytic action of palladium and turn into water, and as a result, only water and air are discharged from the gasochromic system. To increase the chance of contact between palladium and hydrogen, palladium is preferably provided in the form of a palladium thin film. For example, a palladium thin film formed on a support may be used.

When the hydrogen concentration reducer includes a hydrogen storage material that can adsorb and release hydrogen, it is possible to store hydrogen in the hydrogen storage material and prevent discharge of hydrogen from the gasochromic system. Any appropriate material may be used for the hydrogen storage material. For example, the hydrogen storage material may be implemented by a light control thin film used for the light control element of the light control part. In this case, to increase the chance of contact with hydrogen, a light control thin film formed on a support is preferably used. Also, instead of the light control thin film, a hydrogen storage material such as Mg or $LaNi_5$ may be used.

The above configuration makes it possible to reduce the chance that unreacted hydrogen is discharged into the atmosphere surrounding the gasochromic system, and thereby makes it possible to improve the safety.

The gasochromic system according to the present embodiment is described above. The present embodiment makes it possible to provide a gasochromic system that can be made in a small size, has greater flexibility in shape compared with a related-art gasochromic system, and can perform hydrogenation and dehydrogenation in a short period of time with a small amount of hydrogen.

Second Embodiment

In a second embodiment, an exemplary applied configuration of the gasochromic system of the first embodiment is described.

Figure 7A:
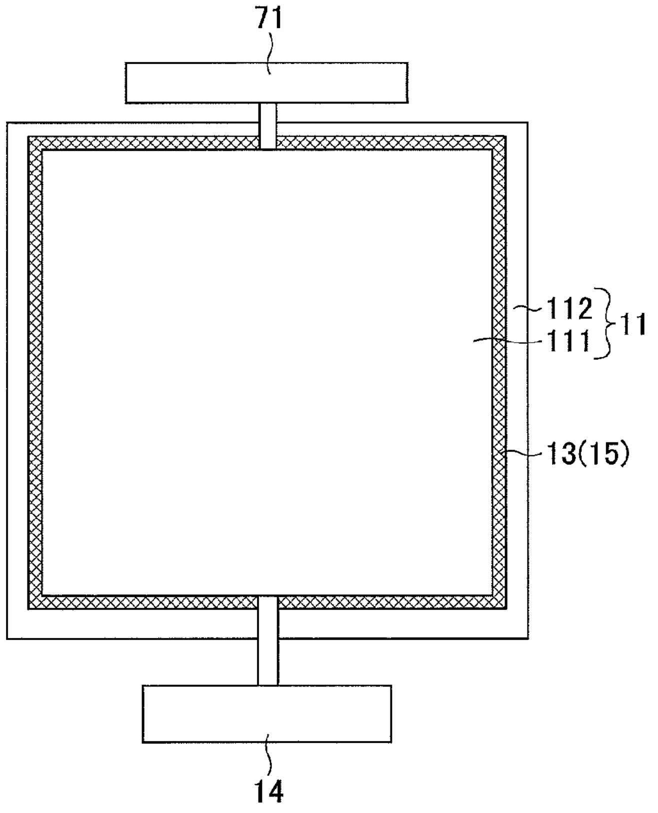
FIG. 7A is a drawing illustrating a gasochromic system (automatic gasochromic system) according to the second embodiment.
Figure 7B:
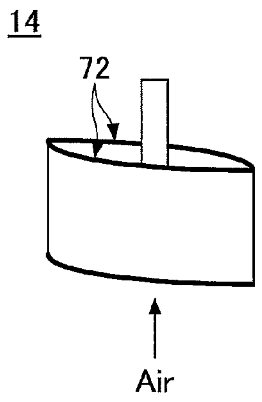
FIG. 7B is a drawing illustrating a hydrogen supplier according to the second embodiment.

A gasochromic system of the second embodiment is an automatic gasochromic system and has a configuration as illustrated by FIGS. 7A and 7B.

Referring to FIG. 7A, the gasochromic system includes a pair of transparent substrates 11 (111, 112) as described in the first embodiment. The transparent substrates 11 include a first transparent substrate 111 and a second transparent substrate 112. A light control part 12 is provided on one of facing surfaces of the first transparent substrate 111 and the second transparent substrate 112. The first transparent substrate 111 and the second transparent substrate 112 are stacked via the light control part 12, and are fixed to each other by a fixing part 13.

The gasochromic system of the present embodiment includes a hydrogen supplier 14 below the transparent substrates 11, and a dehydrogenator 15 that is implemented by an opening(s) formed in a part of the fixing part 13 to allow hydrogen to naturally diffuse and flow out of the gasochromic system.

The hydrogen supplier 14 is implemented by a hydrogen generator that generates hydrogen using a chemical reaction between moisture in the air and a metal and/or a compound. In the present embodiment, as illustrated by FIG. 7B, the hydrogen generator includes a deformable container such as a bag containing moisture in the air and a metal and/or a compound, and a shape memory alloy 72 disposed at a mouth of the container. The shape memory alloy 72 changes its shape according to a change in the outside air temperature. When the outside air temperature increases, the mouth of the container opens to allow air to easily enter the container. This indicates that the amount of generated hydrogen increases when the outside air temperature increases. The generated hydrogen is supplied to the gap between the transparent substrates 11, and the optical characteristic of the light control part (light control element) changes.

When the outside air temperature decreases, the mouth of the container is closed by the shape memory alloy 72 to suppress entry of air into the container, and the amount of hydrogen supplied from the hydrogen supplier (hydrogen generator) decreases. As a result, the amount of hydrogen discharged from the opening formed in the fixing part 13 becomes greater than the amount of supplied hydrogen, the light control part is dehydrogenated, and the optical characteristic of the light control part changes.

When a material (e.g., tungsten oxide) that blocks sunlight when hydrogenated is used for the light control part, the gasochromic system becomes an automatic gasochromic system that blocks sunlight only when the temperature is high.

To prevent condensation in the gap between the transparent substrates, it is preferable to provide a deoxidizer in a container 71 communicating with the gap to reduce the partial pressure of oxygen in the gap.

Third Embodiment

In a third embodiment, an exemplary applied configuration of the gasochromic system of the first embodiment is described.

In the third embodiment, an image display apparatus including the gasochromic system of the first embodiment is described.

Figure 8:
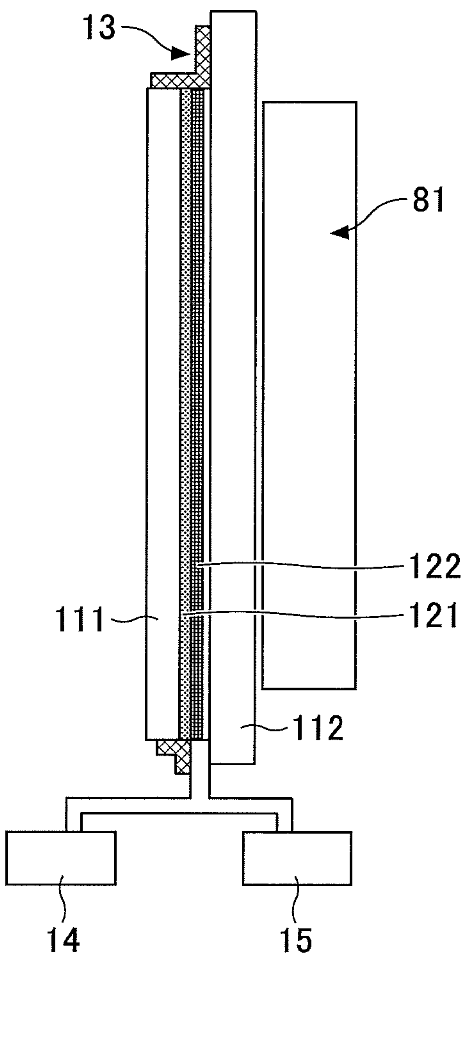
FIG. 8 is a drawing illustrating an image display apparatus including a gasochromic system according to a third embodiment.

As illustrated by FIG. 8, the image display apparatus of the present embodiment includes an image display device 81 and a gasochromic system 10 described in the first embodiment. In this case, to improve visibility, openings are not formed in the transparent substrates 11. Instead, a pipe that communicates with the gap between the transparent substrates 11 is fixed by the fixing part 13, and the hydrogen supplier 14 and the dehydrogenator 15 are connected to the pipe.

In the present embodiment, a reflection-type light control element is preferably used for the light control part (the light control element 121 and the catalyst layer 122) of the gasochromic system.

With this configuration, the light control part may be normally set in a mirror state so that the gasochromic system can be used as a mirror, and changed into a transparent state when it is necessary to watch an image displayed on the image display device. For example, an image display apparatus with this configuration can be preferably used in a barbershop or a beauty parlor.

Fourth Embodiment

In a fourth embodiment, an exemplary applied configuration of the gasochromic system of the first embodiment is described.

In the fourth embodiment, an anti-glare mirror including the gasochromic system of the first embodiment is described. An anti-glare mirror is mainly used as a rearview mirror of a vehicle. The anti-glare mirror changes from a mirror state into a low-reflection state when illuminated by a headlight from behind during the night to prevent glare.

Figure 9:
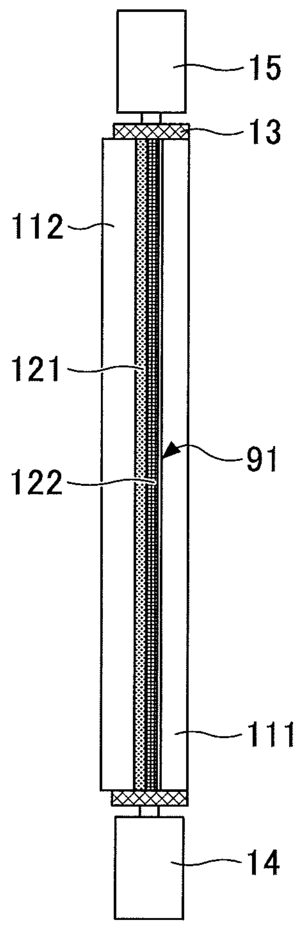
FIG. 9 is a drawing illustrating an anti-glare mirror including a gasochromic system according to a fourth embodiment.

FIG. 9 illustrates an exemplary configuration of the anti-glare mirror. As illustrated by FIG. 9, the anti-glare mirror includes the gasochromic system of the first embodiment and a mirror surface 91 disposed on a surface of the transparent substrate 111. In this case, the light control element of the gasochromic system is preferably implemented by an absorption-type light control material. For example, the light control element is preferably implemented by a tungsten oxide thin film.

With this configuration, hydrogen is supplied into the gap between the transparent substrates by the hydrogen supplier when light is too bright to change the absorption-type light control element into a colored state (e.g., a tungsten oxide thin film becomes a blue color) and thereby prevent glare. When light is not too bright, hydrogen is removed by the dehydrogenator from the gap between the transparent substrates so that the anti-glare mirror can be used as a normal mirror.

The present application claims priority from Japanese Patent Application No. 2013-002675 filed on Jan. 10, 2013, the entire contents of which are hereby incorporated herein by reference.

EXPLANATION OF REFERENCE NUMERALS

11 (111, 112) Transparent substrate
12 (121, 122) Light control part
121 Light control element
122 Catalyst layer
14 Hydrogen supplier
15 Dehydrogenator

The invention claimed is:

1. A gasochromic system, comprising:
- a first transparent part that includes a first surface;
- a second transparent part that includes a second surface and is disposed such that the second surface faces the first surface of the first transparent part;
- a light control part that is formed on the first surface and includes a light control element whose optical characteristic is reversibly changed by hydrogenation and dehydrogenation;
- a hydrogen supplier that supplies a hydrogen-containing gas into a gap between the first and second transparent parts; and
- a dehydrogenator that removes hydrogen from the gap between the first and second transparent parts,
- wherein the first and second transparent parts are stacked via the light control part, and the second surface and a surface of the light control part facing the second surface are partially in contact with each other.

2. The gasochromic system as claimed in claim 1, wherein the dehydrogenator includes a gas supplier that supplies a gas into the gap between the first and second transparent parts.

3. The gasochromic system as claimed in claim 2, wherein the dehydrogenator includes at least one of
- an oxygen reducer that reduces oxygen in the gas supplied by the gas supplier into the gap between the first and second transparent parts, and
- a first moisture remover that removes moisture from the gas.

4. The gasochromic system as claimed in claim 3,
- wherein the gas supplier is configured to recycle the gas supplied into the gap between the first and second transparent parts; and
- wherein the gas supplier includes at least one of the oxygen reducer and the first moisture remover in a path for supplying the recycled gas again into the gap between the first and second transparent parts.

5. The gasochromic system as claimed in claim 2, wherein the gas supplied by the gas supplier is an oxygen-containing gas.

6. The gasochromic system as claimed in claim 5,
- wherein the dehydrogenator includes one of a hydrogen discharger that discharges hydrogen from the gap between the first and second transparent parts and a pressure reducer that reduces a pressure in the gap between the first and second transparent parts;
- wherein the dehydrogenator is configured such that the gas supplier supplies the oxygen-containing gas into the gap between the first and second transparent parts to dehydrogenate the light control element after a hydrogen partial pressure in the gap between the first and second transparent parts is reduced by the hydrogen discharger or the pressure reducer; and
- wherein an oxygen concentration of the oxygen-containing gas is determined such that an amount of water generated in the gap between the first and second transparent parts due to the supplied oxygen-containing gas does not exceed a saturation vapor pressure.

7. The gasochromic system as claimed in claim 1, wherein the dehydrogenator includes one of a hydrogen discharger that discharges hydrogen from the gap between the first and second transparent parts and a pressure reducer that reduces a pressure in the gap between the first and second transparent parts.

8. The gasochromic system as claimed in claim 1, further comprising:
- a pressure reducer that reduces a pressure in the gap between the first and second transparent parts.

9. The gasochromic system as claimed in claim 1, further comprising at least one of:
- an oxygen remover that removes oxygen from the gap between the first and second transparent parts; and
- a second moisture remover that removes moisture from the gap between the first and second transparent parts.

10. The gasochromic system as claimed in claim 9, wherein the gasochromic system is configured such that at least one of the oxygen remover and the second moisture remover removes at least one of oxygen and moisture from the gap between the first and second transparent parts before the hydrogen supplier supplies hydrogen into the gap between the first and second transparent parts.

11. The gasochromic system as claimed in claim 1, wherein the first and second transparent parts are comprised of glass or plastic.

12. The gasochromic system as claimed in claim 1, wherein the light control part further includes a catalyst layer that functions as a catalyst for hydrogenation and dehydrogenation reactions of the light control element.

13. The gasochromic system as claimed in claim 12, wherein the light control part further includes
- a buffer layer that is disposed between the light control element and the catalyst layer and prevents interdiffusion of components of the light control element and components of the catalyst layer, and
- a protective film that is formed on a surface of the catalyst layer, is permeable to hydrogen, and prevents oxidation of the light control element.

14. The gasochromic system as claimed in claim 12, wherein
- the light control element includes at least one of a magnesium alloy thin film and a transition metal oxide thin film; and the catalyst layer includes a thin film that includes at least one of palladium and platinum.

15. The gasochromic system as claimed in claim 1, wherein the hydrogen supplier includes a hydrogen generator that generates hydrogen.

16. The gasochromic system as claimed in claim 15, wherein the hydrogen generator is configured to generate hydrogen from moisture in air.

17. The gasochromic system as claimed in claim 1, further comprising:

a hydrogen concentration reducer that is disposed in a path for discharging the hydrogen-containing gas from the gasochromic system and reduces a concentration of hydrogen in the hydrogen-containing gas to be discharged, wherein the hydrogen concentration reducer includes at least one of palladium and a hydrogen storage material.

18. The gasochromic system as claimed in claim 1, further comprising:

a hydrogen concentration detector that detects a concentration of hydrogen in the gap between the first and second transparent parts, wherein the hydrogen concentration detector is configured to detect the concentration of hydrogen by measuring an electric resistance of the light control element.

19. A gasochromic system, comprising:

a first transparent part that includes a first surface;

a second transparent part that includes a second surface and is disposed such that the second surface faces the first surface of the first transparent part;

a first light control part that is formed on the first surface and includes a light control element whose optical characteristic is reversibly changed by hydrogenation and dehydrogenation;

a second light control part that is formed on the second surface and includes a light control element whose optical characteristic is reversibly changed by hydrogenation and dehydrogenation;

a hydrogen supplier that supplies a hydrogen-containing gas into a gap between the first and second transparent parts; and a dehydrogenator that removes hydrogen from the gap between the first and second transparent parts, wherein the first and second transparent parts are stacked via the first and second light control parts, and facing surfaces of the first and second light control parts are partially in contact with each other.

* * * * *